United States Patent [19]

Sandquist

[11] Patent Number: 5,506,841
[45] Date of Patent: Apr. 9, 1996

[54] CELL SWITCH AND A METHOD FOR DIRECTING CELLS THERETHROUGH

[75] Inventor: Peter W. Sandquist, Huddinge, Sweden

[73] Assignee: Telefonaktiebolaget LM Ericsson, Stockholm, Sweden

[21] Appl. No.: 262,453

[22] Filed: Jun. 20, 1994

[30] Foreign Application Priority Data

Jun. 23, 1993 [SE] Sweden ................................ 9302176

[51] Int. Cl.$^6$ ............................ H04Q 11/04; H04L 12/56
[52] U.S. Cl. .......................... 370/60.1; 370/61; 370/85.6; 370/94.2
[58] Field of Search ............................ 370/60, 60.1, 61, 370/68.1, 17, 58.1, 58.2, 58.3, 63, 64, 66, 85.1, 85.2, 85.6, 94.1, 94.2; 379/242, 258; 340/825.07, 825.52, 825.79

[56] References Cited

U.S. PATENT DOCUMENTS

| | | | |
|---|---|---|---|
| 4,621,359 | 11/1986 | McMillen | 370/60 |
| 4,623,996 | 11/1986 | McMillen | 370/60 |
| 4,630,258 | 12/1986 | McMillen et al. | 370/60 |
| 4,817,084 | 3/1989 | Arthurs et al. | 370/60 |
| 4,899,334 | 2/1990 | Shimizu | 370/60 |
| 5,038,343 | 8/1991 | Lebizay et al. | 370/60 |
| 5,166,926 | 11/1992 | Cisneros et al. | 370/60 |
| 5,255,265 | 10/1993 | Eng et al. | 370/60 |
| 5,291,482 | 3/1994 | McHarg et al. | 370/60 |

FOREIGN PATENT DOCUMENTS 0268259  5/1988  European Pat. Off. .

OTHER PUBLICATIONS

PCT International Search Report No. SE 93/00510, dated Jun. 23, 1993.

Primary Examiner—Alpus H. Hsu
Assistant Examiner—Ricky Q. Ngo
Attorney, Agent, or Firm—Burns, Doane, Swecker & Mathis

[57] ABSTRACT

A cell switch includes a plurality of ports, each being two-way connected to a switch core by means of two transmission channels extending in a respective direction. Tagging devices are provided in the ports for creating, based upon destination information in the head of an incoming cell, a tag belonging to the cell and containing information enabling directing of the cell through the core to the right port. In the core tags are received which have been sent in advance before the corresponding cell and, based upon the information included therein, scheduling information regarding sending times of the respective cells from the ports is created for such scheduling that during these sending times the cells can be sent to the destination ports without conflict arising with other earlier scheduled cells. This scheduling information is sent to the ports of origin of the cells. The cells are retained in the ports until it is time to send them into the core in their respective scheduled sending times.

24 Claims, 9 Drawing Sheets

CELL SWITCH AND A METHOD FOR DIRECTING CELLS THERETHROUGH

BACKGROUND

The present invention relates to a cell switch comprising a switch core, a plurality of switch ports connected to the switch core for directing therethrough cells received from outside the switch and containing useful data and destination information, and for receiving cells from the core, tagging means in the ports for creating, based upon the destination information of a received cell, a tag belonging to the cell and containing routing information enabling directing the cell through the core to a desired destination port.

The invention furthermore relates to a method for routing cells through a cell switch which comprises a switch core, a plurality of switch ports connected to the switch core for directing therethrough cells received from outside the switch and containing useful data and destination information, and for receiving cells from the core.

In a switch of the kind indicated above cell buffers may be arranged so as to avoid loss of cells which simultanously arrive to the switch and shall pass a resource common to the cells, e.g. an output. In known systems cell buffers need to be located in the switch core for attaining this object. In order to attain a high efficiency a great number of cell buffers in the switch core are therefore required.

By locating cell buffers only in the switch ports the magnitude of the core and thereby its cost could be reduced. This would be advantageous in that a low cost for the switch core reduces the total cost for scaleable systems which have been configured with only a few number of ports. The switch cost would thus be more modular.

One problem is, however, how to avoid conflict in the switch core so that the need of cell buffers in the core may be eliminated.

In EP 268,259 there is described a switch with a multiple stage packet transfer between switch inputs and outputs. A tag identifies packet destination for directing the packet to a suitable output while avoiding transmission conflicts. Buffering is provided for packets which may not immediately be transferred due to conflicts, an upper limit being set for the stay of the packet in the packet transferring network.

The packets are handled in several steps and the tags are modified between the steps, but the tags are not sent in advance for scheduling of the sending times of the packets from the input ports.

In U.S. Pat. No. 4,630,258 there is described a packet transfer node with a number of input and output ports. One single queue is connected to each input port for storing and transferring packets to all output ports. Conflicts may appear between packets directed to different ports. A multiple port memory is connected between the input and output ports. A control logic is arranged to e.g. transfer packets from the memory to output ports identified in corresponding directing tags on the basis of a predetermined priority scheme. A buffer logic arbitrates tags arriving to the same input ports and competing for the same output port. Furthermore there is carried through a random choice of packets directed to the same output port without need for the packet to wait during an undetermined time.

No tagging is carried through in the input ports. Existing tags follow the transferred packets and are thus not sent in advance.

In U.S. Pat. No. 4,621,359 there is described packet transfer where a packet transfer node handles packets containing directing tags indicative of output port destinations. The aim is to provide a balance of the number of packets addressed for each of the output ports. New tags are therefore generated for redistributing the output port load. The new tags are modified in order to obtain a predetermined output priority scheme.

There is no sending in advance of tags for providing a time controlled sending scheme for subsequent packets.

In U.S. Pat. No. 4,623,996 there is described a packet transfer node which handles packets including directing tags indicative of output port destinations. A plurality of queue switches are individually connected between a plurality of input ports and a plurality of queue sets including a plurality of queues which store and transfer applied packets as a function of the output port destination. The queues of each queue set are connected to different output arbitrators which control the directing to a particular output port.

Tags are not sent in advance for obtaining a time controlled sending scheme for following packets.

SUMMARY

One object of the invention is to solve, in a switch of the kind identified by way of introduction, the problem with conflict in the core in such a way that the need of cell buffers in the core is eliminated.

The switch according to the invention comprises means for sending the tags to the switch core in advance of corresponding cells. Scheduling means are provided in the core for receiving the tags sent in advance and, based upon said routing information included therein, providing scheduling information regarding sending times of the respective cells from the ports for such scheduling that during these sending times the cells can be sent to the destination ports without conflict arising with other earlier scheduled cells. Means are furthermore provided for sending the scheduling information to the ports of origin of the cells. Delay means retain the cells in the ports until their respective scheduled sending times appear, and the cells are then sent into the core in their respective scheduled sending times.

In the method according to the invention there is created, based upon the destination information of received cells, a respective tag for each received cell containing routing information enabling directing the cell through the core to a desired destination port. The tags are sent to the switch core in advance of corresponding cells. Based upon the routing information included in the cells sent in advance, scheduling information is created regarding sending times of the respective cells from the ports for such scheduling that during these sending times the cells can be sent to the destination ports without conflict arising with other earlier scheduled cells. The scheduling information is sent to the ports of origin of the cells, which are retained in the ports until their respective scheduled sending times appear.

According to the invention conflict is thus avoided by the switch ports in advance providing routing information to the core. Thereby a suitable feedback to the ports may be obtained so that cells may be sent so that simultaneous passing of common resources is avoided.

The cells are directed through the core by means of tags. A tag is a directing information preceding each cell. Each tag contains directing information which is not related to the immediately following cell, but to some cell following thereafter, the cells being thus delayed in the ports. Processing of the directing information is carried through in the core, whereafter a suitable scheduling information is fed back to the ports.

The cells are transferred in adjacent fixed length intervals called transmission cycles and are sent through the core while using tags including internal cell destinations. The cell destinations may be provided, in a way known per se, as bits in a bitmap, whereby a cell can have several destinations (Multi-Casting). Tagging is carried through in the ports. Each cell is preceded by a tag. The tags are transferred during the cell transmission cycles from the ports to the core. In the opposite direction, i.e. from the core to the ports, scheduling information is transferred and a flag for valid cell is transferred instead of the tags during the transmission cycles.

The phase location between incoming and outgoing transmission cycles is somewhat different so that a cell in a transmission cycle from a port to the core has time to pass through the core and without any extra delay may be located in a transmission cycle from the core to the port.

Cells are delayed in the ports a determined least number of transmission cycles after corresponding tags have been sent to the core so that time is reserved for processing for avoiding conflicts.

Conflict is avoided by distribution in time of the cells. The core schedules all cells and informs the ports so that the ports are forced to transmit the cells in certain transmission cycles. Cells contending for a common resource are transferred in different transmission cycles. A tag without directing information indicates to the core that no new cell is waiting for being scheduled. The solution according to the invention results in a small core which may be used independently of the magnitude of the system within certain restrictions with a good cost efficiency. Furthermore systems being small from the beginning may easily be upgraded without loss of the original investment.

BRIEF DESCRIPTION OF THE DRAWINGS

The invention will now be described more closely below with reference to the attached drawings, on which

DETAILED DESCRIPTION

Figure 1:
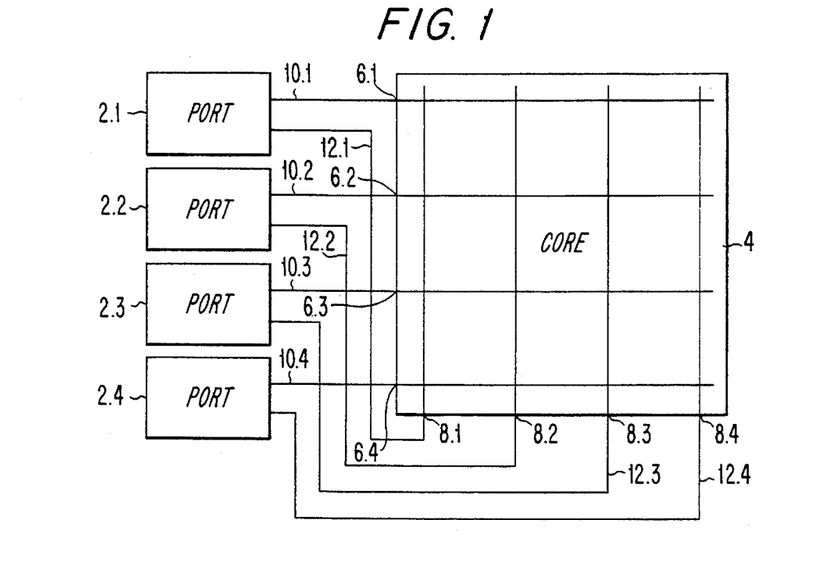
FIG. 1 illustrates the topology of an examplary cell switch in which the invention is used.

FIG. 1 schematically shows a type of cell switch in which the invention can be used.

The switch includes a number of ports 2.n and a switch core 4 with a number of inputs 6.n and outputs 8.n. For the sake of simplicity there are shown in FIG. 1 only four ports 2.1–2.4, four inputs 6.1–6.4, and four outputs 8.1–8.4. The ports 2.n form the outer interface of the switch. A plurality of user terminals may be connected to each port.

Through two oppositely directed transmission channels 10.n and 12.n, respectively, each port 2.n is connected to a corresponding input 6.n and output 8.n, respectively, of the switch core.

As an example the switch may be a crossbar type switch and non-blocking, i.e. it shall be able to connect arbitrary combinations of inputs and outputs simultaneously. The invention is, however, not limited to any particular inner structure of the switch.

Cell buffers are required for avoiding loss of cells due to conflict in the outputs, i.e. when several cells destined for the same output port are sent to the switch with time overlap.

According to an important feature of the invention all cell buffers are localized to the ports. Since the core lacks cell buffers particular measures must be taken for avoiding conflict of cells. This is performed, in a way to be described more closely below, by scheduling the arrival of the cells to the core and letting them in so as to avoid conflict at the outputs of the core.

All ports work cell-synchronously and the cells are transferred in adjacent fixed length intervals called transmission cycles. The cells are stored in memory elements while awaiting their respective sending times. In the system given as an example it is assumed that the cells have some form of addressing information which is collected and translated by table look-up to internal directing information in the form of bit maps, where the positions of the bits represent different outputs. These maps obtained from the translation table are called tags, which is an adopted concept. In known systems the tags are sent together with their corresponding cells, whereas in the system according to the present invention the tags and the corresponding cells are separated.

Figure 2:
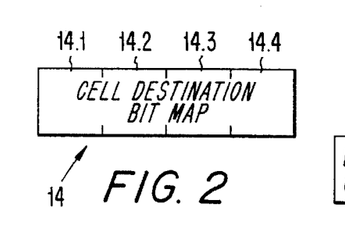
FIG. 2 shows a tag with its cell directing bitmap.

FIG. 2 schematically illustrates a tag 14 with a cell destination bitmap, including four fields 14.1–14.4, which in the example given quite simply are imagined as corresponding to each one of the four columns of the switch core. Each field may contain a bit which, e.g. only if it is set to one, indicates that the corresponding cell is destined to the column in question.

As will be described more closely below there are sent during each transmission cycle from each port 2.n a tag and a cell, which do not correspond to each other. The tag has the double function of providing directing information to the switch core 4 and requesting a transmission cycle for the corresponding cell. The core 4 processes the request and assigns a transmission cycle indicating a cell transmission time for the port 2.n. The port awaits this point of time and sends the cell in the assigned transmission cycle. During the wait period other request and cells may be handled.

When the tags in a transmission cycle have been received there is started the process of scheduling all the requested cells. All tags and corresponding scheduling information are saved until the cells have been sent. The scheduling information (the assigned transmission cycle), being the result of the scheduling process, is sent during the immediately following transmission cycle from the core 4 to the port 2.n in question.

Figure 3:
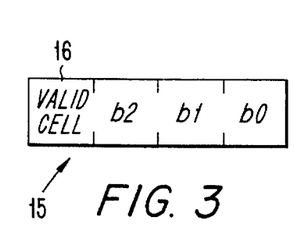
FIG. 3 shows the format of the scheduling information.

FIG. 3 illustrates schematically the format of the scheduling information which is generally designated 15. The representation is binary. The three last of the four fields shown correspond to a bit b0, b1 and b2, respectively, corresponding to the first, second and third, respectively, bit of a three bit word. A zero (all bits set to zero) indicates that access to the core is admitted after a delay of a determined least number of transmission cycles. All other numbers indicate further wait cycles. 5 indicates e.g. that the cell shall be delayed further 5 transmission cycles. During this time cells directed to other outputs may be transmitted. The first of the four fields shown comprises a flag 16 for a valid cell. The flag is activated when the cell sent from the core 4 to the ports 2.n is valid and not an idle cell.

Figure 4:
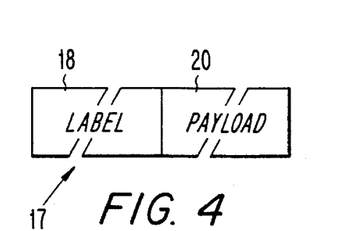
FIG. 4 shows a cell consisting of a label and useful load.

FIG. 4 shows a cell 17 consisting of a label 18 and a useful load 20. The label is only interpreted and is possibly manipulated by a high level protocol in the switch ports. No internal directing is performed directly on the basis of the label.

Figure 5:
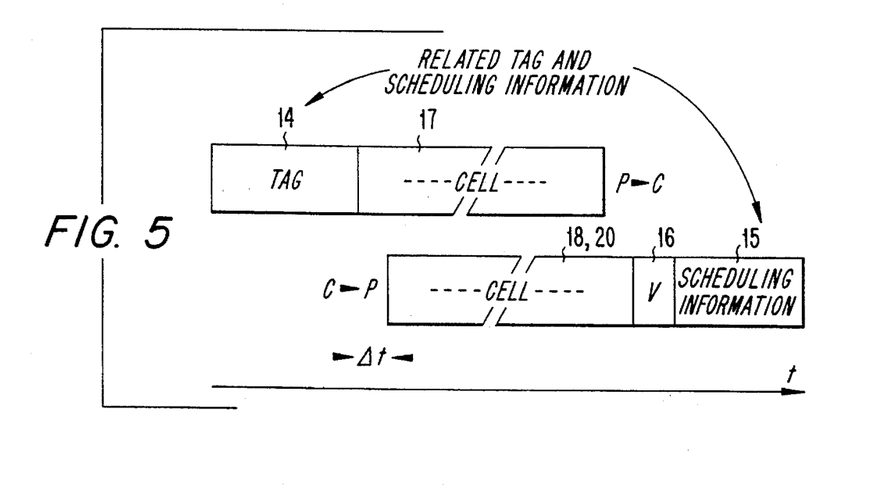
FIG. 5 shows the phase shift between the transmission cycles for port-to-core and core-to-port, and the relation between the tag and scheduling information related to the tag.

FIG. 5 shows the phase shift $\Delta t$ between the transmission cycles for the cell 17 with tag 14, which does not belong to this cell, in the direction port-to-core and, respectively, for the same cell 17 with a scheduling information 15 corresponding to the tag, in accordance with FIG. 3, and flag 16 for a valid cell in the direction core-to-port.

Figure 6:
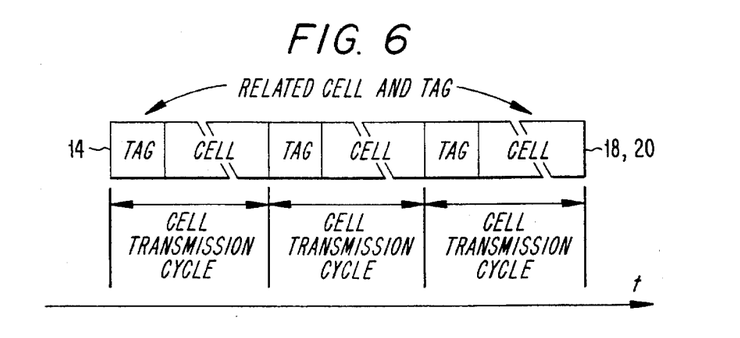
FIG. 6 shows the localization of a tag and its corresponding cell which is delayed by two transmission cycles.

FIG. 6 shows the localizing of a tag 14 and its corresponding cell 17 when the cell is delayed by two transmission cycles. In the present embodiment this is a determined least delay.

When the cells arrive in accordance with the scheduling information 15 the saved tags 14 and the scheduling information are used for establishing the correspondence between the cells and the output port destinations.

Figure 13:
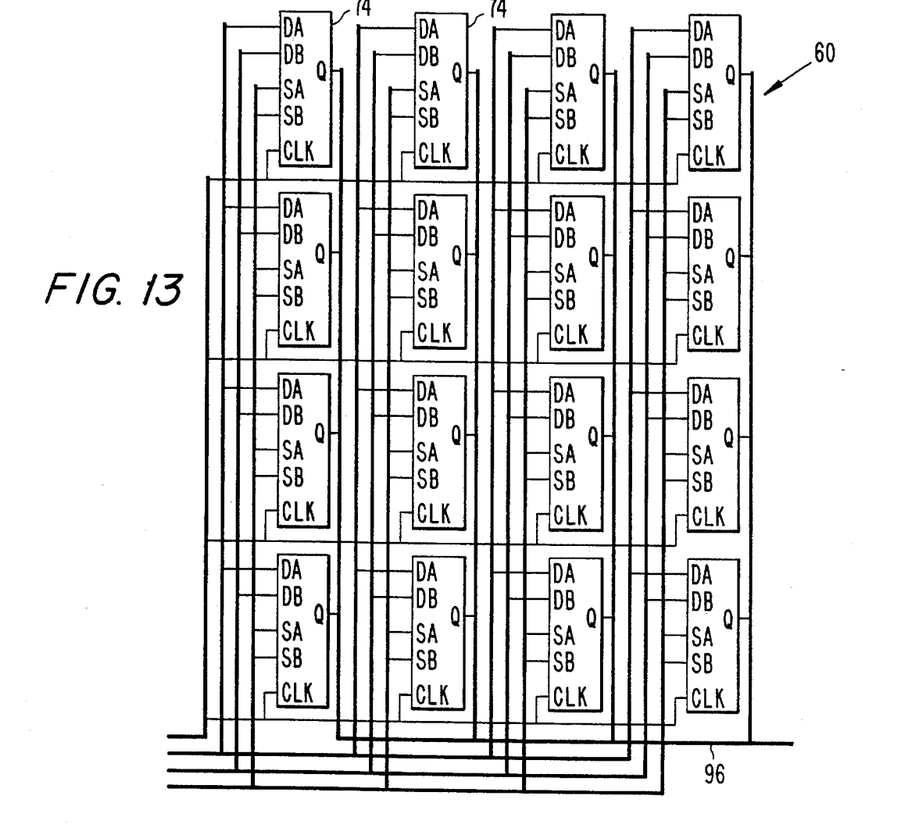
FIG. 13 shows an instance of the memory for scheduled data.
Figure 14:
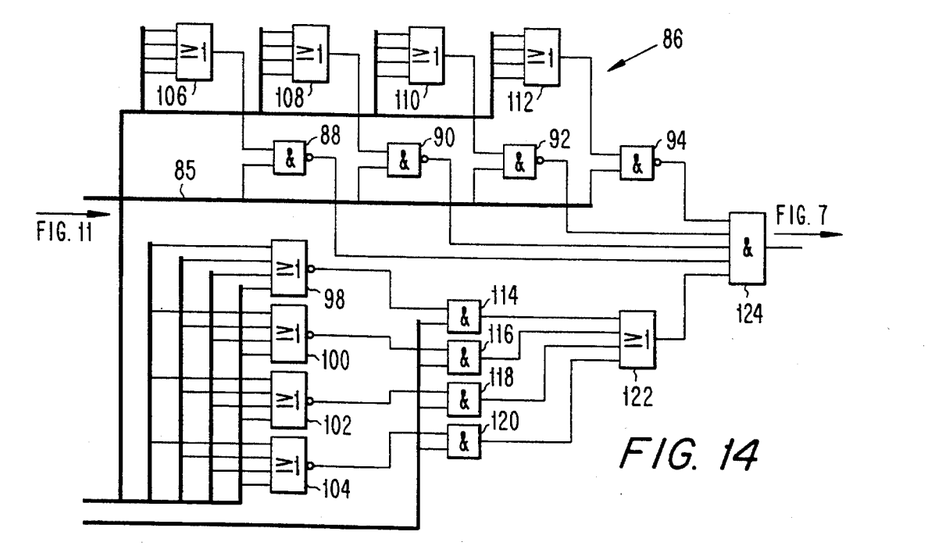
FIG. 14 shows an instance of a conflict control block.
Figure 15:
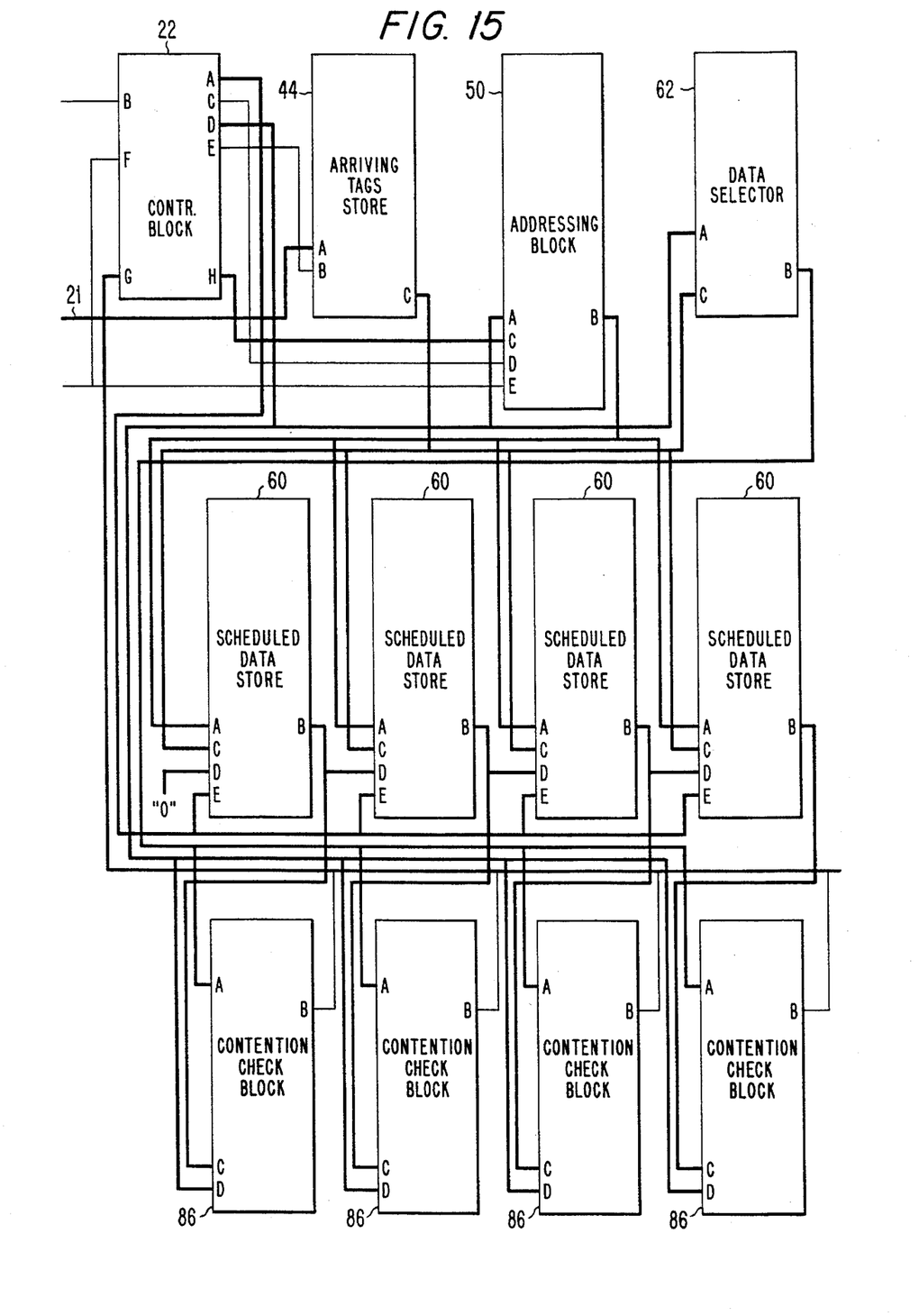
FIG. 15 shows the scheduler including a number of the blocks shown in FIG. 7–14.

The scheduler structurally consists of a number of blocks shown in FIGS. 7–14, which are interconnected in accordance with FIG. 15.

The scheduler on its inputs, designated 21 in FIG. 15, receives the tags arriving from the ports—one from each port. These tags comprise directing information and request for transmission cycles.

The scheduler processes all such request from the ports, one at a time, during a transmission cycle. As the request are processed, one after the other, it becomes successively less probable during a transmission cycle that outgoing transmission cycles may be found, in which a conflict cannot appear. For this reason the order of processing of request is changed for each transmission cycle for attaining fairness between the ports.

The scheduler takes care of all tags corresponding to the coming third—sixth transmission cycles. All tags are stored in memory positions representing respective relative sending times. As each transmission cycle progresses all tags are shifted into storing positions representing more adjacent scheduling times. The tags shifted out of the scheduler are shifted into FIFOs, not shown, which delay the tags two further transmission cycles comprising the outgoing first and second transmission cycles. The storing positions thus always reflect the current state as time lapses, and thus the relative transmission times have been changed.

The input for "serial loading" of the storing position, that contains tags belonging to the most remote transmission cycle is fed with "not scheduled" (zeros). The output from the said FIFOs is a map over the crossing points which shall be activated in each transmission cycle.

Each arriving tag is checked against earlier scheduled tags with respect to the risk for conflict. All processing of an arriving tag is performed simultaneously. Provided that at least one outgoing transmission cycle has been found, in which conflict does not appear, the tag is stored in the storing position, that represents the earliest such transmission cycle.

After a complete sequence of processing of all tags of an incoming transmission cycle some or all of the cells corresponding to these tags may have been scheduled. Their respective transmission times have been established during the processing and are supplied to a device that organizes the transmission of scheduling information (the cell transmission times) to the ports.

Failure in scheduling of a cell may be indicated by e.g. stating a relative transmission time which is greater than the available number of storing positions, instead of a correct transmission time.

Figure 7:
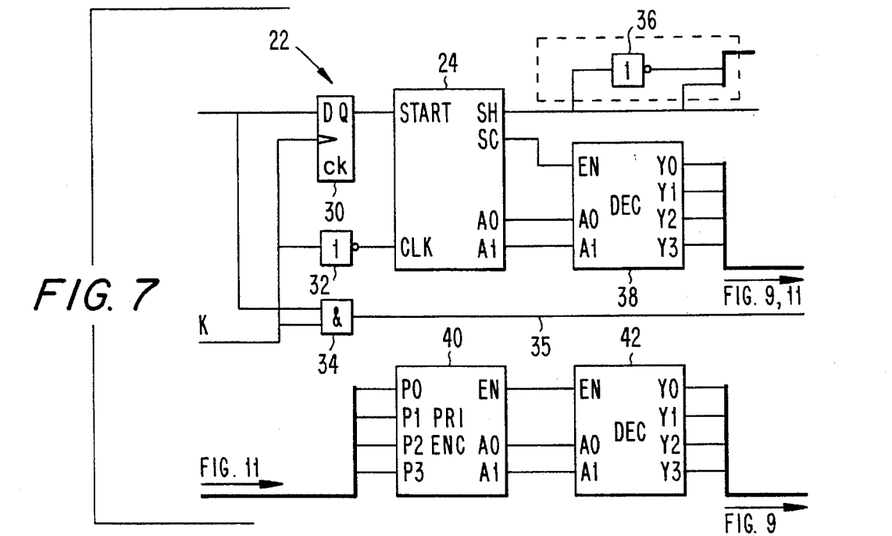
FIG. 7 shows a block forming a part of a scheduler, and controlling the scheduling sequence and time priority.

A-control circuit acting as an input circuit of the scheduler, and generally indicated 22, is shown in FIG. 7 and 15. The control circuit 22 contains a state machine 24, which is shown in more detail in FIG. 8 together with the appurtenant state table 26 and state graph 28.

The control circuit 22 in a way to be described more closely below controls the scheduling sequence and time priority.

Figure 8:
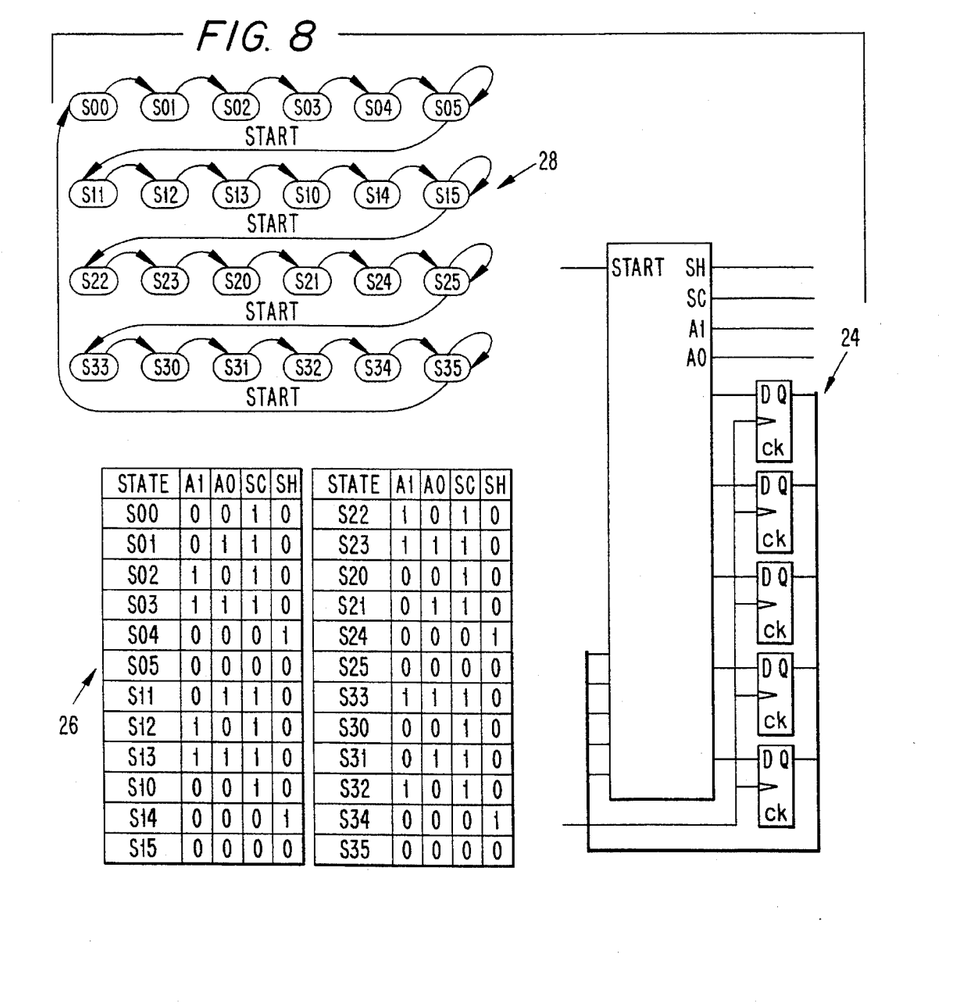
FIG. 8 shows a state machine forming part of the scheduler and being included in a control block.

Referring to the state table 26, the state machine 24 has four rest states S05, S15, S25 and S35, in which it is sensitive to an arriving start signal on an input START. The start signal arrives once for each transmission cycle when arriving tags are available. The state machine 24 then performs counting operations (modulo-4), whereafter a state appears in which an output SH (for SHift) is active. Thereafter the next rest state appears. During the counting states an output SC (for SChedule) is active. Each of the four counting sequences have different start values as appears from the state table.

A D-flipflop 30 receives the start signal intended for the state machine 24 and synchronizes it with a clock signal K before it is being fed to the input START of the state machine 24. The clock signal is also supplied to an inverter 32, which creates an antiphase clock for the clock input CLK of the state machine 24. The clock signal also is supplied to one input of an AND gate 34, the other input of which is connected for receiving the start signal, so that the gate 34 on its output 35 supplies a synchronized locking signal for arriving tags.

The signal SH is decoded by an inverter 36 (one bit decoder). The decoded signal consists of the signal SH and the output from the inverter 36. A decoder 38 connected to the state machine 24 in the way shown activates one of its outputs Y0–Y3 when the activating signal appears on its input ENable which is thus performed during a counting sequence.

A priority encoder 40 encodes the highest order input signal which is activated on one of its inputs P0–P3. An output signal on its output ENable is set to zero when none of its inputs is activated. A decoder 42 connected to the encoder 40 in the way shown, is identical to the decoder 38. The priority encoder 40 and decoder 42 together form a block that activates only one of the outputs Y0–Y3, that corresponds to the highest order input that is activated.

The function of the control circuit shown in FIG. 7 will appear from the following description of the scheduler and its function in connection with FIGS. 9–15.

Figure 10:
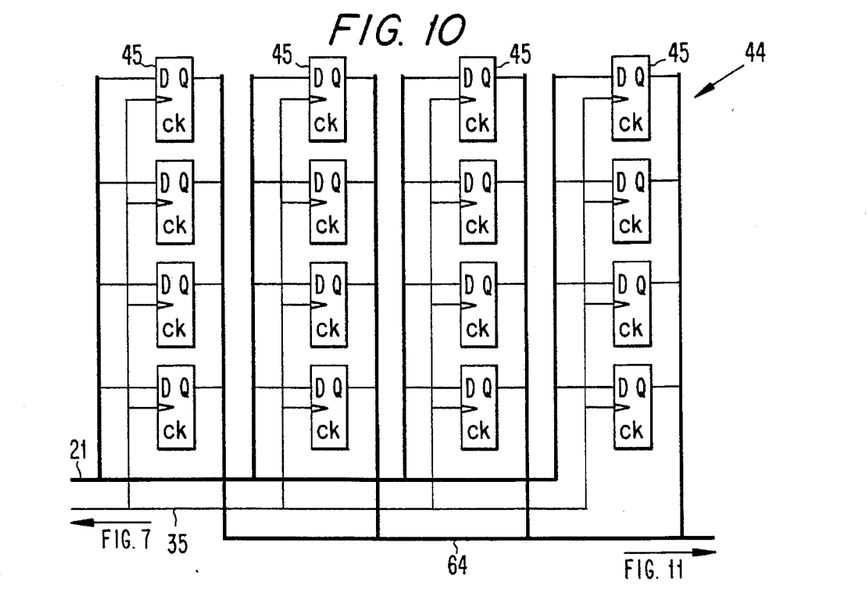
FIG. 10 shows a memory for arriving tags.

The tags arriving to the scheduler on an input 21 are stored in a memory 44 in accordance to FIG. 10. Each row in this memory represents a tag for a particular port 2.n, and each column represents an address to one of the output ports 8.n. The tags are stored in a row of the memory in D-flipflops 45 and are locked by the locking signal, which in accordance with the above appears on the output 35 of the AND gate 34 in the control block 22. The outputs of the memory 44 are connected to inputs of a data switch which is described below with reference to FIG. 11.

Figure 9:
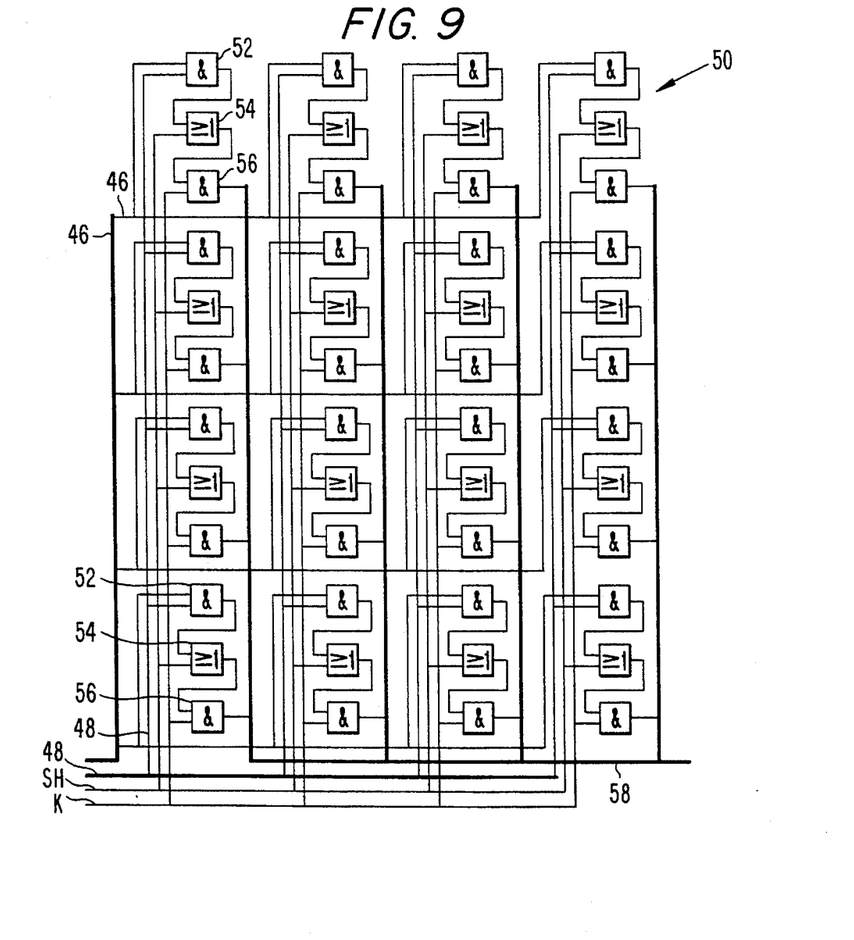
FIG. 9 shows a block forming part of the scheduler and creating lock pulses for memories for scheduling data.

The output signals of the decoders 38, 42 are fed to row conductors 46 and column conductors 48, respectively, of an addressing block 50 shown in FIG. 9, that creates locking pulses for a memory for scheduling data, which is described more closely below with reference to FIGS. 12 and 13. To the row and column conductors 38 and 42, respectively, the respective inputs of AND-gates 52 are connected, and therefore a combination of signals—one activated signal for each decoder 38 and 42, respectively,—thus activates the output of one of these AND-gates. The block 50 also contains OR-gates 54, in which one input is connected to the output of the corresponding AND-gate 52, and the other input is connected to the output SHift of the control block 22.

The outputs of the OR-gates 54 are all activated when SHift of the control block 22 is activated. Whenever either the SHift signal or the decoder signal to an AND-gate 52 is activated, the output of the OR-gate 54 connected to this particular AND-gate 52 will thus be activated. The outputs of the OR-gates 54 are connected to an input of a respective AND-gate 56. The other input of each AND-gate 56 is connected for receipt of the clock signal K, and its output forms one of the outputs 58 of the addressing block 50, and therefore signals appearing on the later are synchronized with the clock.

The addressing block 50 clocks either a storing position of a tag memory 60, to be described more closely below, for scheduled request (FIG. 13), that represents a particular input port and an outgoing transmission cycle, or all storing positions.

Figure 11:
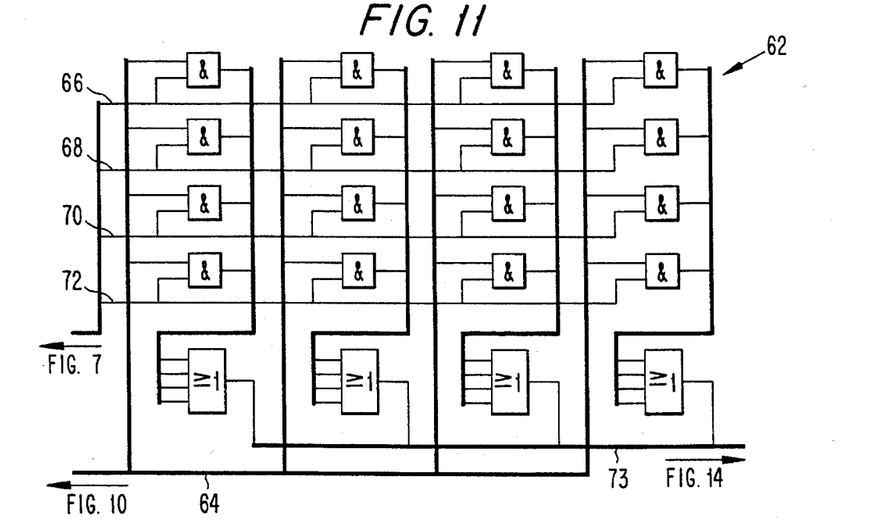
FIG. 11 shows a data selector choosing between one of the rows from the memory for arriving tags and presenting it on the outputs.

A data switch 62 shown in FIG. 11 has, as has been mentioned above, inputs 64 connected to the outputs of the memory 44, and control inputs 66, 68, 70, 72 connected to the output of the decoder 38. The data switch 62 emits one of the tags from the memory 44 on one of its outputs 73 when the appurtenant control input 66–72 is activated.

Figure 12:
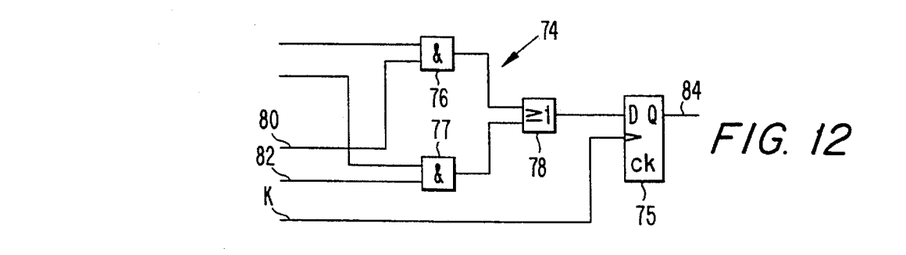
FIG. 12 shows a circuit included in several places in the memory for scheduling data.

FIG. 12 shows a block 74 with a flipflop 75 and an input switch consisting of AND-gates 76, 77 and an OR-gate 78. The control inputs 80 and 82 are connected to one input of a respective one of the gates 76, 77. When one of the control inputs 80, 82 is activated and the flipflop 75 is clocked, the data on the data input corresponding to the activated control input is locked and presented on the output 84 of the flipflop 75.

A group of blocks 74 of the kind shown in FIG. 12 is included in the memory 60, shown in FIG. 13, for scheduled requests. Each row of the group can receive one tag.

FIG. 14 shows an instance of the conflict control block. The conflict control block checks one tag at a time from the memory of arriving tags against a corresponding instance of the memory for scheduled tags.

The outputs from the data switch 62 shown in FIG. 11 are connected to inputs 85 of each of four conflict checking blocks 86 according to FIG. 14. The bits of a singled out tag are fed to one input of NAND-gates 88, 90, 92, 94 in each conflict checking block. Each conflict checking block 86 is also connected to a corresponding one of the four tag memories 60 for scheduled request according to FIG. 13. The outputs 96 for all rows and columns of the memories 60 are rowwise connected to NOR-gates 98, 100, 102, 104, and columnwise to OR-gates 106, 108, 110, 112. The NOR-gates 98–104 set their outputs to zero when an arbitrary bit on their respective rows is set to one. One of the rows is pointed to by AND-gates 114, 116, 118, 120 and an OR-gate 122, the output of which is connected to one of five inputs of and AND-gate 124. The outputs from the OR-gates 106–112 are set to one when an arbitrary bit on their respective columns is set to one. The respective other input of the NAND-gates 88–94 is connected to the output of a respective one of the OR-gates 106, 108, 110 and 112, respectively. The NAND-gates 88–94 therefore set their outputs to zero when their respective tag bits received on the input 85 and an arbitrary one of the bits in a column received from the corresponding OR-gate 106–112 is set to one. The outputs of the NAND-gates 88–94 form a respective one of the further inputs of the AND-gate 124. The output of the AND-gate 124 is therefore set to one when there are no bits set to one in the row pointed to, and tag bits set to one on the input 85 do not exist on the same columns as bits set to one in the tag memories. An arriving tag will then possibly be able to be placed into the memory 60 for scheduled requests, which appears from the following.

The outputs of all AND-gates 124 are connected to the priority encoder 40 of the control block 22, and therefore those of the inputs P0–P3 of the priority encoder will be set to one, which correspond to transmission cycles, in which cells can be successfully scheduled. The priority encoder 40 encodes the highest order input to a binary (2 bit) word and an ENable signal. The output of the priority encoder 40 forms the earliest outgoing transmission cycle (if there is one), which does not cause cell conflict for the cell to be scheduled. All outputs of the priority encoder 40 are connected to the inputs of the encoder 42 and to flipflops, not shown, and a device arranging for sending scheduling information to the ports. The outputs of the encoder 42 are connected to column selecting inputs of the addressing block 50, one output for each column. The columns of the addressing block thus represent outgoing transmission cycles.

The arriving tag of a row which is processed, is fed to the inputs of all tag memories 60 for scheduled requests but from the addressing block 50 a locking pulse arrives only to the storing position in the tag memories, that represents a port, from which the processed request arrives, and an outgoing transmission cycle, in which no conflict will appear, whereby the tag is only clocked into this storing position.

At appearance of states in which SHift is activated, the decoder including the inverter 36 will bring the input selector included in the block in FIG. 12 to choose the other data input. These inputs and outputs 84 are so connected that a data shift is performed when the flipflops are clocked.

Figures 16, 17:
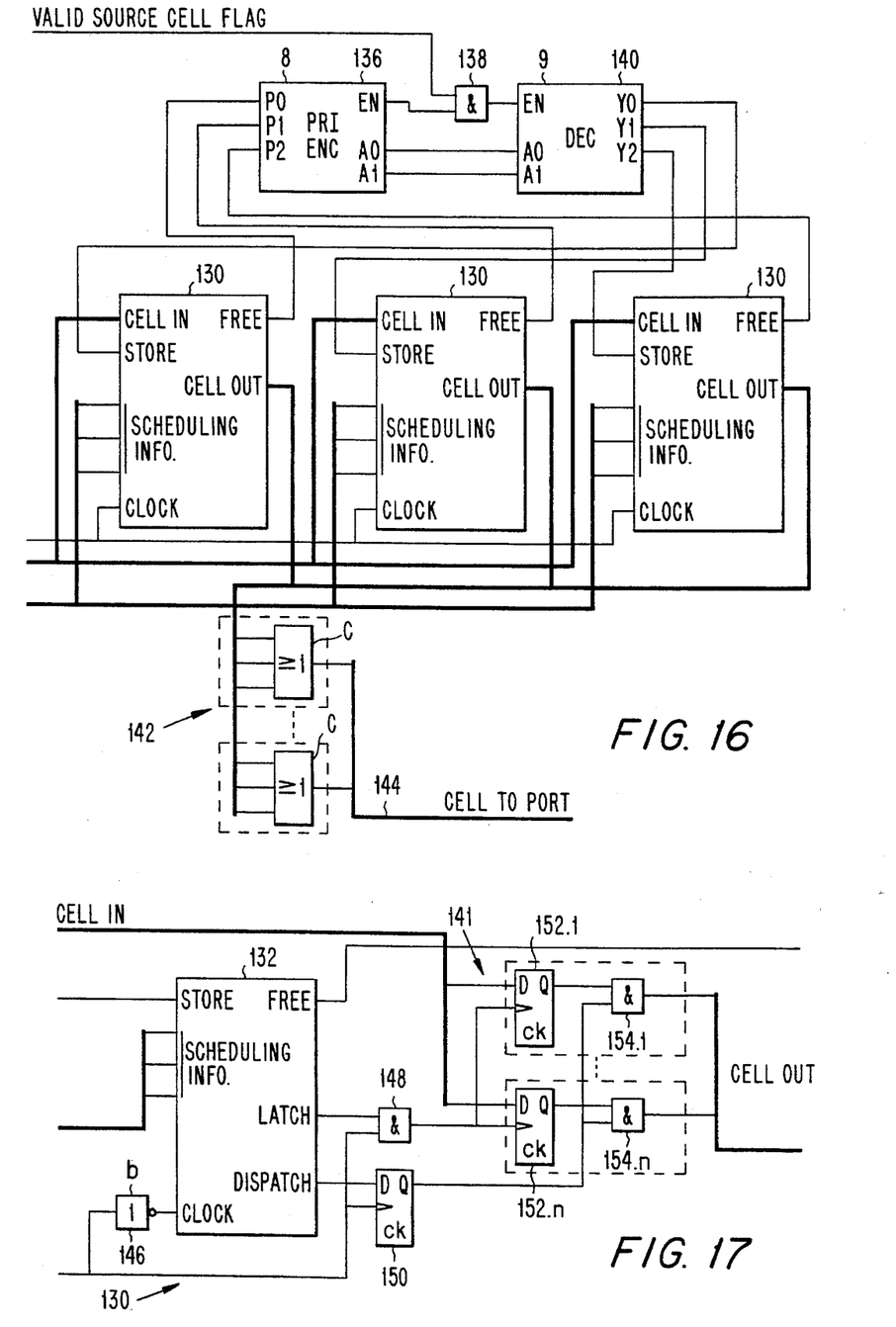
FIG. 16 shows a delay means which detains the cells in the ports and sends them to the core in the scheduled transmission cycles.
FIG. 17 shows a block included in several instances in the delay means.

In each of the ports 2.n there is a delay means of the kind shown in FIG. 16. While awaiting scheduling information from the scheduler a cell arriving from outside the system is intermediately stored in a cell buffer, not shown, in the port. The cell is presented on the input "CELL IN" in all blocks 130 included in the delay means for further delay of cells, but is only stored in D-flipflops 152 in the block 130, the input "STORE" of which is set to one. Based upon scheduling information arriving from the core and presented for the inputs "SCHEDULING INFO", the cell on the output "CELL OUT" is presented at the point of time, in which the cell shall be sent to the port, as will be described more closely below.

Figure 18:
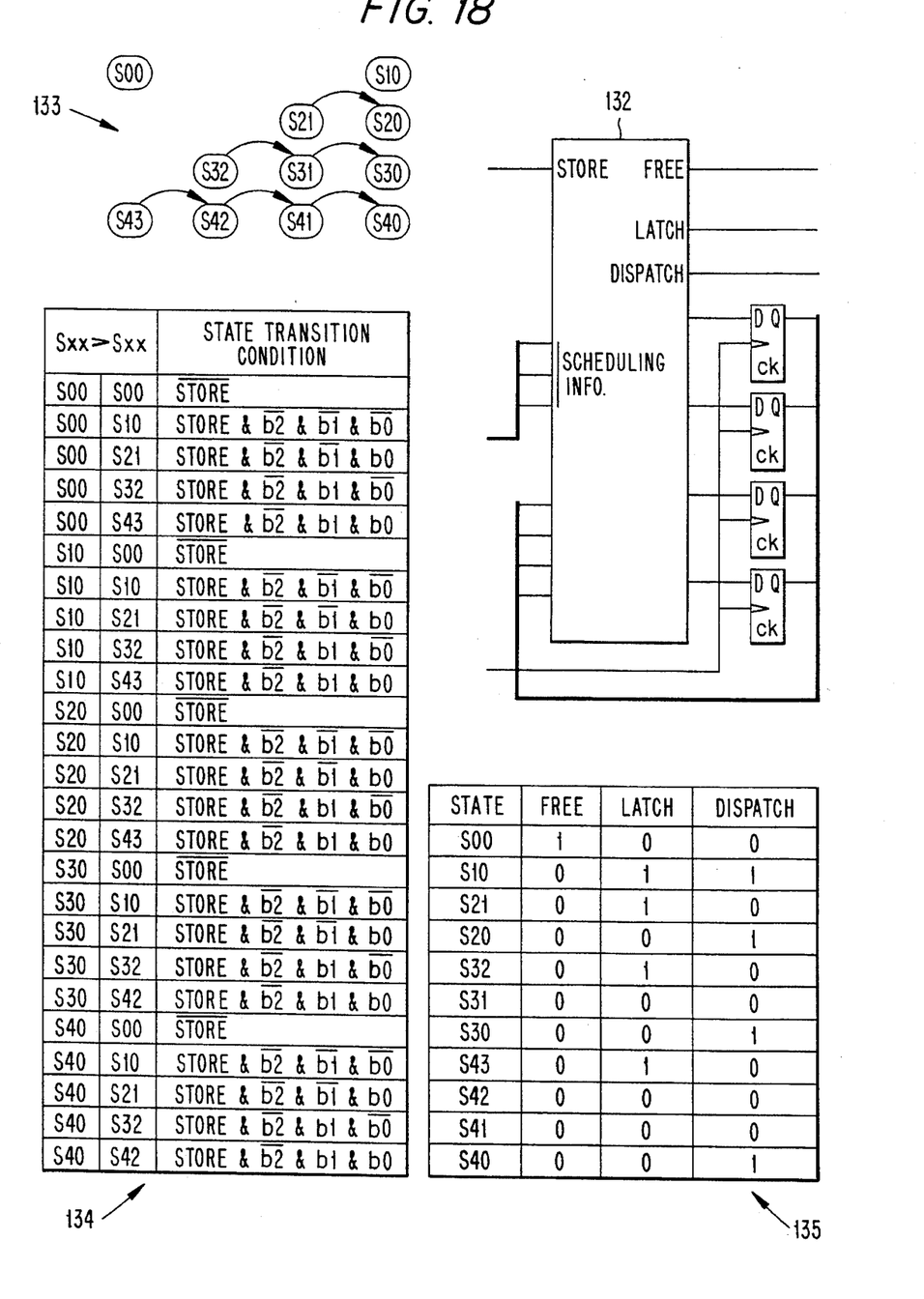
FIG. 18 shows a state machine forming part of a block according to FIG. 17 of a delay means in the respective port.

A block of the kind mentioned above is also shown in more detail in FIG. 17, a state machine 132 included therein being shown in FIG. 18 together with a corresponding state graph 133, a table 134 with state changing conditions and a state table 135.

Each of the blocks 130 has an output "FREE" which, when set to one, indicates that a corresponding buffer may store a new cell. These outputs from the blocks 130 are supplied to inputs P0, P1 and P2, respectively, of a priority encoder 136. The priority encoder 136 has an output EN (for ENable) connected to an input of an AND-gate 138 which, in a way shown in FIG. 16, by another input is connected for receiving a flag "VALID SOURCE CELL FLAG". When set to one this flag indicates that a cell arriving from outside the system is not an idle cell. The output of the AND-gate 138 is connected to an input EN (for ENable) of a decoder 140. When the two inputs of the AND-gate are set to one, which occurs when the flag "VALID SOURCE CELL FLAG" and at least one of the inputs P0, P1 or P2 are set to one, the output on the AND-gate 138 is set to one. Thereby also some of the outputs Y0, Y1 or Y2 from the decoder 140 are set to one, corresponding to the highest order input which is activated by the inputs P0, P1 and P2 of the priority encoder 136. This has the result that a cell buffer 141 of that one of the blocks 130 that has its input "STORE" set to one, will be loaded with the cell, and that it guided by scheduling information received in the same block is presented on the output "CELL OUT" of the cell buffer in the transmission cycle, in which the cell shall be sent to the port. Through OR-gates 142 the cell is presented on the output 144 of the delay means, since only one buffer at a time can have outputs set to one.

The means included in each of the blocks 130 for presenting a cell from a cell buffer 141 in the right transmission cycle include the state machine 132, which provides a locking signal on the output "LATCH", counts down the number of transmission cycles that is indicated by the scheduling information, which is received on the inputs "SCHEDULING INFO", and provides a reading out signal on the output "DISPATCH" when count down has been performed.

The state graph 133 in FIG. 18 shows the states and the state transitions appearing when the state machine counts down time. The state S00 is a rest state in which the state machine is when the cell has been sent away and no new cell shall be stored in the cell buffer. The state S10 concerns reading out of the cell in the immediately following transmission cycle, whereas S20, S30 and S40 concern reading out after count down.

The table 134 with state changing conditions shows the rest of the state transitions. To the rest state S00 the state machine arrives from S00 (the same state), S10, S20, S30 or S40. To S10, S21, S32 and S43 the state machine arrives either from the rest state or from the state S10 (the same state), S20, S30 or S40. To S10 the state machine arrives if the cell shall be sent in the immediately following transmission cycle, whereas arrival to S21, S32 and S43 occurs if the cell shall be delayed for further transmission cycles.

In the state table 135 the status of the outputs are shown in different states. "FREE" is set to one only in the state S00. "LATCH" is set to one in the states S10, S21, S32 and S43. "DISPATCH" is set to one in the states S10, S20, S30 and S40.

For obtaining an antiphase clock for the state machine 132 the clock signal is sent to "CLOCK" via an inverter 146. An AND-gate 148 and D-flipflop 150 are connected to the output "LATCH" and "DISPATCH", respectively, of the state machine 132. The clock signal is also connected to the other input of the AND-gate 148 and the clock input of the D-flipflop 150, whereby synchronization occurs of the signals "LATCH" and "DISPATCH" with the clock. The output from the AND-gate 148 is connected to clock inputs of D-flipflops 152.1–152.n, which together form the cell buffer 141 and the data input D of which is connected to the input "CELL IN" of the block 130.

The output from the D-flipflop 150 is connected to an input of AND-gates 154.1–154.n, in which a second input is connected to a respective output of the D-flipflops 152.1–152.n. The output of the AND-gates 154 is connected to the output "CELL OUT" of the block 130. Thus clocking of the cell buffer 129 is controlled via the AND-gate 148 by the signal "LATCH", and the presentation of the cell on the output "CELL OUT" of the block 130 via the D-flipflop 150 by the signal "DISPATCH".

The clock pulses arrive synchronously and in phase with outgoing transmission cycles. In the same transmission cycle as the scheduling information for a cell arrives, it and "STORE" must be stable at the point of time when the state machine is clocked.

Figure 19:
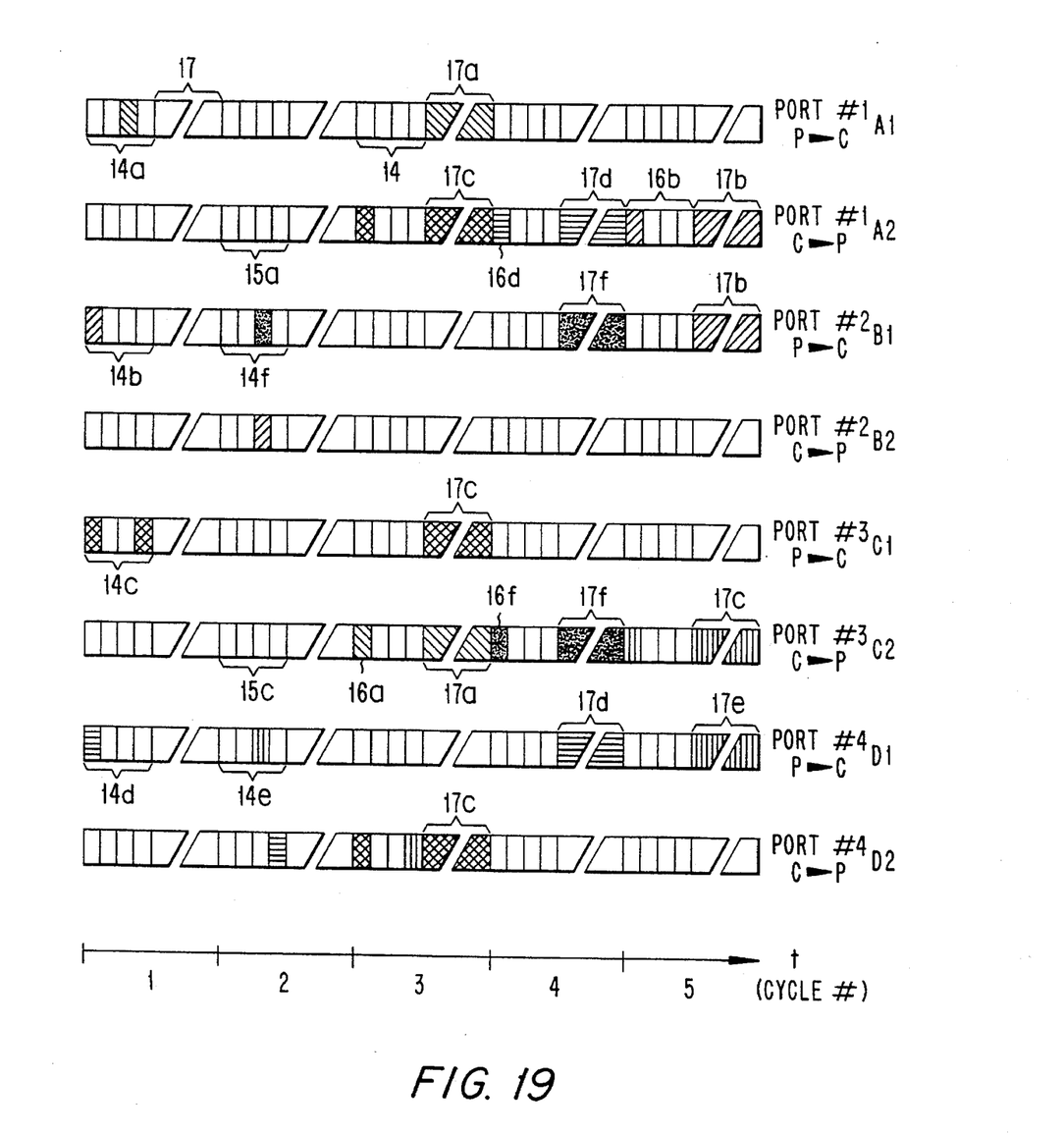
FIG. 19 shows a scenario during which cells are connected through a switch of the suggested type with use of the invention.

In FIG. 19 there is shown an exemplary coupling scenario for demonstrating a possible behaviour of the system. Five complete consecutive transmission cycles for port-to-core and core-to-port are shown and indicated below in the figure.

For indicating tag, cell and scheduling information in FIG. 19 the same concepts and reference characters are used as has been described with reference to and shown in FIG. 2–6. Different sets of interconnected tag, cell and scheduling information are distinguished on the one hand by addition of a different small letter, although common to the tag, cell and scheduling information, after the respective reference character, on the other hand by different line markings in the figure.

Each tag is indicated by a sequence of four equally sized rectangular fields, corresponding to the fields 14.1–14.4 in FIG. 2 and, as therein, indicating a bit. The same is true for the scheduling information with fields corresponding to the fields 16, b2, b1, b0 in FIG. 3. Each cell is indicated, as in FIG. 5, with a lying and obliquely cut rectangle.

The rows A1 and A2 designate a transmission cycle for port-to-core and core-to-port, respectively, relating to a first port, which may be imagined to correspond to the port 2.1 in FIG. 1. The same is true for the rows B1 and B2, C1 and C2, D1 and D2 with respect to the ports 2.2, 2.3 and 2.4, respectively.

During the first transmission cycle there is supplied, as appears from line A1, a tag 14a to the core from the port 1. With the tag 14a also a cell 17 is supplied which, as has been said earlier, does not belong to the tag 14a. The tag 14a indicates a request to send a cell to the port 3, by its third bit (14.3) being set to one, indicated by the line marking of the field in question. Since no other requests to send cells to the port 3 appear, the cell 17a belonging to the tag 14a is scheduled a determined least delay as appears on line A2 by the scheduling information 15a from the core to port 1 in the transmission cycle 2 (all bits b2, b1 and b0 are set to zero). The least delay determined in the exemplary system is two transmission cycles. Port 1 receives scheduling information 15a and accordingly sends the cell 17a to the core in the transmission cycle 3, as shown in line A1. The core indicates, line C2, in the transmission cycle 3 in the direction from the core to port 3 that the cell 17a is valid, as appears from the flag 16a. In the same transmission cycle the core sends the cell 17a to the port 3 with a minimum dt of further delay and practically no buffering.

Three tags 14b, 14c and 14d in lines B1, C1 and C3, respectively, with conflicting cell destinations to port 1, as appears from the respective first field (14.1 in FIG. 2), are transferred to the core during the transmission cycle 1. The tag 14c of the port 3 indicates that the cell belonging thereto has several destinations, viz. besides port 1 also port 4 (fields 14.1 and 14.4 in FIG. 2).

The conflict processing algorithm residing in the core has assigned different sending times to the cells from ports 2, 3 and 4 corresponding to the tags 14b, 14c and 14d with a common destination to port 1. Depending upon the state of the state machine 24 in the example, the tag 14b from the port 3 will be processed first in the core, cf. the scheduling information 15c in line C2, and thereby obtain the earliest sending time, and thereafter ports 4 and 2 follow. The cell 17c from the port 3 is thus sent to port 1 and 4 in the transmission cycle 3, cf. line C1 for direction to the core, and lines A2 and D2 for direction towards the respective ports. The cell 17d together with a tag not belonging thereto is sent from the port 4 to the core, cf. line D1, and from there to port 1 in the transmission cycle 4, cf. line A2. The cell 14b together with a tag not belonging thereto is sent from port 2 to the core, cf. line B1, and from there to the port 1 in the transmission cycle 5.

As the scheduled cell 17d of the port 4, with destination port 1, waits for being sent further, a new cell 17e from port 4 with destination port 3 is scheduled. To the cell 17e is assigned the transmission cycle 5, cf. line D1 and C2, since earlier scheduled cell from port 4 shall be sent further in the transmission cycle 4. As the scheduled cell 17b in port 2, with destination port 1, is waiting for being sent further, there is scheduled and sent further another cell 17f from port 2 to port 3, cf. line B1 and C2.

What is claimed is:

1. A cell switch comprising:

a switch core, a plurality of switch ports connected to said switch core for sending therethrough, in cell transmission cycles, cells received from outside the switch and containing addressing information, tagging means in the switch ports for creating, based upon said addressing information of a received cell, a tag belonging to the received cell and containing routing information for routing the received cell through the switch core to a desired destination port, means for sending each tag to the switch core in a cell transmission cycle in advance of the cell transmission cycle of the cell to which the tag belongs, scheduling means in the switch core for receiving each tag sent in advance and, based upon said routing information included therein, for creating sending time scheduling information regarding a sending time for the cell to which the tag belongs such that during said sending time the cell can be sent to its destination port without conflict arising with other cells, means for sending, for each cell, said sending time scheduling information to the switch ports of origin of the cell, delay means for retaining each cell in its switch port until it scheduled sending time occurs, and means for sending each cell into the switch core in its scheduled sending time in a cell transmission cycle.

2. A switch according to claim 1, wherein between the transmission cycle for transmission of a tag and the transmission cycle for transmission of a corresponding cell, there is a time delay of at least a predetermined number of transmission cycles for avoiding conflict.

3. A switch according to claim 1, wherein during each transmission cycle a scheduled cell and a tag of a cell not yet scheduled are transferable from a switch port to the switch core.

4. A switch according to claim 1, wherein a cell, the scheduling information of a later cell, and a flag for a valid cell are sent from the switch core to a switch port.

5. A switch according to claim 1, wherein an invalid tag indicates to the switch core that no new cell waits to be scheduled.

6. A switch according to claim 1, wherein the tags sent from the switch ports and containing routing information each include an implicit request for assignment of a transmission cycle for sending the related cell.

7. A switch according to claim 6, wherein said scheduling means processes all such requests one at a time during a transmission cycle, an order of processing being changed for each transmission cycle for attaining fairness between the switch ports.

8. A switch according to claim 6, wherein said scheduling means stores all tags belonging to scheduled cells.

9. A switch according to claim 6, wherein the scheduling means stores all tags in storage locations that implicitly indicate relative sending times for their corresponding cells, all stored tags being shifted for each new transmission cycle into new storage locations representing nearer sending times so that the tags are always stored in storage location indicating the relative sending times.

10. A switch according claim 6, wherein each tag arriving to the switch core is checked in parallel against tags of earlier scheduled cells regarding risk of conflict.

11. A switch according to claim 6, wherein a failure in scheduling a cell is indicated by a relative sending time for the cell which is greater than an available number of storage locations.

12. A method for routing cells through a cell switch which comprises a switch core, and a plurality of switch ports connected to said switch core for sending therethrough, in cell transmission cycles, cells received from outside the switch and containing addressing information, and said switch core interconnecting said switch ports for enabling communication between them, said method comprising the steps of:

creating, based upon said addressing information of a received cell, a tag belonging to the received cell and containing routing information for routing the received cell through the switch core to a desired destination port, sending each tag to the switch core in a cell transmission cycle in advance of the cell transmission cycle of the cell to which the tag belongs, creating, based upon said routing information included in a tag, sending time scheduling information regarding a sending time for the cell to which the tag belongs such that during said sending time the cell can be sent to its destination port without conflict arising with other cells, sending, for each cell, said sending time scheduling information to the port of origin of the cell, retaining each cell in its switch port until its scheduled sending time occurs, and sending each cell into the switch core in its scheduled sending time in a cell transmission cycle.

13. A method according to claim 12, comprising the step of providing, between a transmission cycle for transmission of a tag and a transmission cycle for transmission of the corresponding cell, a time delay of at least a predetermined number of transmission cycles for avoiding conflict.

14. A method according to claim 12, comprising the step of transferring during each transmission cycle a scheduled cell and a tag of a cell not yet scheduled, from a switch port of the switch core.

15. A method according to claim 12, further comprising the step of sending during a transmission cycle a cell, the scheduling information of a later cell, and a flag for valid cell from the switch core to a switch port.

16. A method according to claim 12, comprising the step of indicating to the switch core by sending an invalid tag that no new cell waits for being scheduled.

17. A method according to claim 12, comprising the step of checking each tag arriving to the core in parallel against tags of earlier scheduled cells regarding risk of conflict.

18. A method according to claim 12, comprising the step of indicating a failure in scheduling a cell by relative sending time for the cell which is greater than an available number of storage locations.

19. A method according to claim 12, comprising the step of providing each of the tags sent from the switch ports and containing routing information with an implicit request for assignment of a transmission cycle.

20. A method according to claim 19, comprising the steps of processing all said requests, one at a time, during a transmission cycle, and changing an order of such processing for each transmission cycle for attaining fairness between the switch ports.

21. A method according to claim 19, comprising the step of storing all tags belonging to scheduled cells.

22. A method according to claim 21, comprising the steps of storing all tags so that the storage locations implicitly indicate relative sending times for their corresponding cells, and shifting all tags for each new transmission cycle into new storage locations representing nearer sending times so that the tags are always stored in storage locations indicating the relative sending times.

23. A cell switch, comprising:

a switch core;

a plurality of switch ports, each switch port being connected to said switch core;

tagging means in said switch ports for creating, based upon addressing information of cells received from outside said cell switch, a tag for each of said received cells, which tag comprises routing information for routing a received cell relating to said tag through said switch core;

means for routing said cell through said switch core by utilizing said tag;

scheduling means in said switch core for
(i) receiving said tags from said switch ports,
(ii) creating, based upon said routing information included in each tag, scheduling information indicating a sending time from said switch ports for each of said cells, said sending time being such that said cells when being sent through said switch core in their respective sending times do not conflict with one another, and
(iii) sending said sending time for each one of said cells to respective switch ports of origin of said cells; and delay means in said switch ports for retaining said cells in said switch ports until their respective said sending times occur, as determined by said scheduling means.

24. A method for routing cells through a cell switch, said method comprising the steps of:

creating, based upon addressing information of cells received from outside said cell switch, a tag for each of said received cells, which tag comprises routing information for routing a received cell relating to said tag through said switch core;

routing said cell through said switch core by utilizing said tag;

sending said tags to said switch core;

creating, based upon said routing information included in each tag, scheduling information indicating a sending time from said switch ports for each one of said cells, said sending time being such that said cells when being sent through said switch core in their respective sending times do not conflict with one another;

sending said sending time for each of said cells to switch ports of origin of said cells;

retaining said cells in said switch ports until their respective scheduled sending times occur; and sending said cells into said switch core in their respective scheduled sending times.

* * * * *